(12) United States Patent
Kassai et al.

(10) Patent No.: US 7,484,801 B2
(45) Date of Patent: Feb. 3, 2009

(54) DETACHABLE CHILD SAFETY SEAT

(75) Inventors: Kenzou Kassai, Osaka (JP); Haruo Kawano, Tenri (JP); Makoto Fukui, Nara (JP)

(73) Assignee: Graco Children's Products Inc., Exton, PA (US)

( * ) Notice: Subject to any disclaimer, the term of this patent is extended or adjusted under 35 U.S.C. 154(b) by 257 days.

(21) Appl. No.: 11/441,540

(22) Filed: May 26, 2006

(65) Prior Publication Data

US 2006/0273640 A1 Dec. 7, 2006

(30) Foreign Application Priority Data

Jun. 3, 2005 (JP) ............... 2005-163722
Jun. 3, 2005 (JP) ............... 2005-163723

(51) Int. Cl.
*B60N 2/28* (2006.01)
(52) U.S. Cl. ............ 297/256.16; 297/256.13; 297/256.14
(58) Field of Classification Search ........... 297/130, 297/250.1, 256.16, 468, 256.13, 256.14
See application file for complete search history.

(56) References Cited

U.S. PATENT DOCUMENTS

| 3,915,493 | A | | 10/1975 | Brown |
| 4,306,749 | A | * | 12/1981 | Deloustal ............... 297/256.16 |
| 4,733,909 | A | | 3/1988 | Single, II et al. |
| 5,385,387 | A | * | 1/1995 | Kain ..................... 297/256.16 |
| 5,772,279 | A | * | 6/1998 | Johnson, Jr. ............... 297/130 |
| 5,865,447 | A | * | 2/1999 | Huang .................... 297/256.16 |
| 6,196,629 | B1 | | 3/2001 | Onishi et al. |
| 6,299,249 | B1 | * | 10/2001 | Mori .................... 297/256.13 |
| 6,367,875 | B1 | * | 4/2002 | Bapst ..................... 297/250.1 |
| 6,540,293 | B1 | * | 4/2003 | Quackenbush ......... 297/256.13 |
| 6,595,583 | B2 | * | 7/2003 | Hou .......................... 297/130 |
| 6,715,828 | B1 | * | 4/2004 | Cheng ................... 297/256.16 |

FOREIGN PATENT DOCUMENTS

| EP | 0 619 201 | 10/1994 |
| EP | 1 247 688 | 10/2002 |
| GB | 2 368 275 | 5/2002 |
| JP | 10-250426 | 9/1998 |
| JP | 2000-301969 | 10/2000 |

* cited by examiner

*Primary Examiner*—Peter R. Brown
(74) *Attorney, Agent, or Firm*—W. F. Fasse; W. G. Fasse

(57) ABSTRACT

A detachable child safety seat comprises a base member, a seat body mounted on the base member detachably, an upper locking mechanism to lock or unlock a stand wall of the base member and a backrest of the seat body, a lower locking mechanism to lock or unlock a bottom wall of the base member and a seat of the seat body, and a synchronization mechanism to connect the upper locking mechanism to the lower locking mechanism so as to synchronize locked states or unlocked states of both locking mechanisms.

15 Claims, 21 Drawing Sheets

DETACHABLE CHILD SAFETY SEAT

BACKGROUND OF THE INVENTION

1. Field of the Invention

The present invention relates to a child safety seat in which a seat body and a base member are detachable.

2. Description of the Background Art

The same applicant who files this application disclosed a child safety seat in Japanese Unexamined Patent Publication No. 10-250426. According to the child safety seat disclosed in this document comprises a base member, and a seat body turnably supported on the base member. The turnable seat body is positioned in a forward-looking manner, a backward-looking manner and a sideway-looking manner according to need.

According to the above turnable child safety seat, since the seat body is turned on the base member fixed onto a car seat, the base member has to be large enough to allow the seat body to be turned. Thus, the child safety seat cannot help being enlarged.

In order to miniaturize the child safety seat, it is preferable that the seat body can be detached from the base member. One example of such child safety seat is disclosed in Japanese Unexamined Patent Publication No. 2000-301969. According to the child safety seat disclosed in the document also, the seat body is positioned in a forward-looking manner, a backward-looking manner and a sideway-looking manner according to need.

In the case of the child safety seat disclosed in Japanese Unexamined Patent Publication No. 2000-301969, four engagement parts to mount the seat body are provided in the base member, and pins which can engage with the engagement parts are provided on a lower surface of a seat of the seat body.

Since a fixed connection structure between the seat body and the base member disclosed in Japanese Unexamined Patent Publication No. 2000-301969 is very complicated, a more simple structure is desired.

In addition, in the case of the detachable child safety seat, it is necessary to surely and strongly connect the seat body to the base member. Furthermore, in case of unexpected occurrence, it is desired that the seat body cannot be easily detached from the base member.

SUMMARY OF THE INVENTION

It is an object of the present invention to provide a detachable child safety seat in which a seat body and a base member can be surely and strongly connected and fixed.

It is another object of the present invention to provide a detachable child safety seat having an excellent shock absorbing performance.

A detachable child safety seat according to the present invention comprises a base member, a seat body, an upper locking mechanism, a lower locking mechanism, and a synchronization mechanism. The base member has a bottom wall and a stand wall rising from a rear end of the bottom wall and extending upward. The seat body has a seat and a backrest and it is mounted on the base member detachably. The upper locking mechanism locks or unlocks the stand wall of the base member and the backrest of the seat body. The lower locking mechanism locks or unlocks the bottom wall of the base member and the seat of the seat body. The synchronization mechanism connects the upper locking mechanism to the lower locking mechanism and synchronizes locked states or unlocked states of both locking mechanisms.

According to the above constitution, the seat body and the base member can be strongly connected and fixed by the upper and lower locking mechanisms. In addition, since the operations of the upper and lower locking mechanisms can be synchronized by the synchronization mechanism, the connection fixing operation can be easily performed.

According to a preferred embodiment, the upper locking mechanism comprises a lift member which is supported on the stand wall of the base member and can be displaced in the vertical direction, and an engaged member provided on a back surface of the backrest of the seat body so as to be engaged with the lift member when it is brought to an upper position. In this embodiment, the synchronization mechanism comprises a connection member to connect the lift member to the lower locking mechanism.

Preferably, the upper locking mechanism comprises forcing means for forcing the lift member to be brought to the upper position.

According to a preferred embodiment, the lower locking mechanism comprises a catch clamp provided in the bottom wall of the base member, an engagement rod provided on a bottom surface of the seat of the seat body so as to be caught by the catch clamp to be engaged, and a locking member supported on the base member and displaced so as to selectively lock an engagement state between the catch clamp and the engagement rod. In this embodiment, the synchronization mechanism comprises a connection member to connect the locking member to the upper locking mechanism.

Preferably, the lower locking mechanism comprises forcing means for forcing the locking member in the engagement direction.

According to one embodiment, the synchronization mechanism comprises a stopper member supported on the base member and displaced between an upper position in which it abuts on the locking member to prevent the locking member from being moved in the engagement direction, and a lower position in which it is lowered by the engagement rod received in the catch clamp to allow the locking member to be moved in the engagement direction, and an elastic member for forcing the stopper member upward.

Preferably, the synchronization mechanism comprises an operation member to bring the locking member to an unlocked position.

According to a preferred embodiment, the upper locking mechanism comprises a lift member which is supported on the stand wall of the base member and can be displaced in the vertical direction, and an engaged member provided on a back surface of the backrest of the seat body so as to be engaged with the lift member when it is brought to an upper position. The lower locking mechanism comprises a catch clamp provided in the bottom wall of the base member, an engagement rod provided on a bottom surface of the seat of the seat body so as to be caught by the catch clamp to be engaged, and a locking member supported on the base member and displaced so as to selectively lock an engagement state between the catch clamp and the engagement rod. In this embodiment, the synchronization mechanism comprises a wire to connect the lift member to the locking member.

According to a preferred embodiment, a base side front engagement member extending in a width direction at a front position, and a base side rear engagement member extending in the width direction at a rear position are provided in the base member. A seat body side engagement member extending along a side of a square substantially and engaging with the base side front engagement member or the base side rear engagement member is provided in a bottom surface of the seat body.

According to the above embodiment, since the seat body side engagement member is positioned along the side of the square substantially, when the seat body is positioned in the forward-looking state, the backward-looking state or the sideway-looking state, the seat body side engagement member can engage with the base side engagement member in substantially the same structure. Therefore, the connection fixed structure between them can be simplified.

Preferably, the base side front engagement member comprises two front catch clamps positioned apart from each other in the width direction. In addition, the base side rear engagement member comprises two rear catch clamps positioned apart from each other in the width direction. In addition, the seat body side engagement member comprises a front engagement rod positioned at the front and extending in the width direction, a rear engagement rod positioned at the rear and extending in the width direction, and a pair of side engagement rods positioned at both sides and extending in the forward and backward direction.

Preferably, when the seat body is positioned on the base member in a forward-looking manner, the front engagement rod and the rear engagement rod engage with the front catch clamp and the rear catch clamp, respectively. When the seat body is positioned on the base member in a backward-looking manner, the rear engagement rod and the front engagement rod engage with the front catch clamp and the rear catch clamp, respectively. When the seat body is positioned on the base member in a sideway-looking manner, the pair of engagement rods engages with the front catch clamp and the rear catch clamp, respectively. According to one embodiment, the lower locking mechanism locks or unlocks at least either one of the base side front engagement member or the base side rear engagement member and the seat body side engagement member.

According to a preferred embodiment, the base member comprises a rigid frame structure body, a pair of first belt guide members provided on both sides of the frame structure body, through which a car mounted waist belt passes, a metal band having both ends connected to the frame structure body, and, a pair of second belt guide members positioned inside the pair of first belt guide members in the width direction and fixed to the metal band, through which the waist belt passes.

According to the preferred embodiment having the above constitution, when a shock load is applied to the second belt guide member, the metal band is bent and plastically deformed. Since the metal band is elastically deformed, the shock load added to the base member is absorbed to some extent, so that the shock applied to a child sit on the child safety seat can be reduced.

According to one embodiment, the second belt guide member is a U-shaped metal hook.

Furthermore, according to a preferred embodiment, the frame structure body comprises a pair of L-shaped metal bar members positioned on both sides, and a pair of metal side plates fixed to the bar members. The first belt guide member is fixed to the metal side plate, and both ends of the metal band are connected to the pair of metal side plates.

According to one embodiment, the base member comprises an inclination adjustment member which can be moved between a position in which it is protruded downward from the bottom surface and a position in which it is retreated in the bottom surface. The inclination adjustment member is held by the base member so that it can pivot, for example.

DESCRIPTION OF THE PREFERRED EMBODIMENTS

Figure 1:
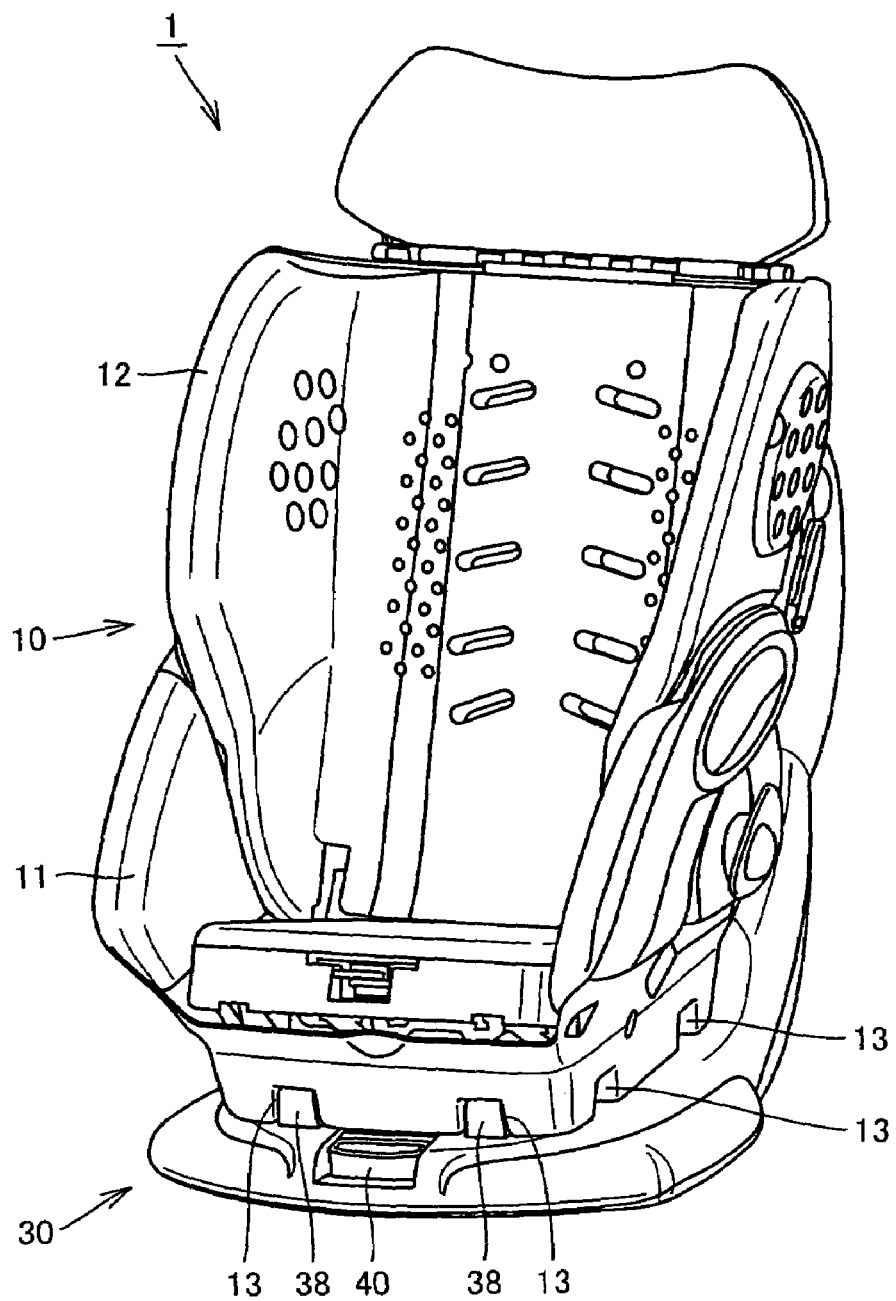
FIG. 1 is a perspective view showing a detachable child safety seat according to one embodiment of the present invention.
Figure 5:
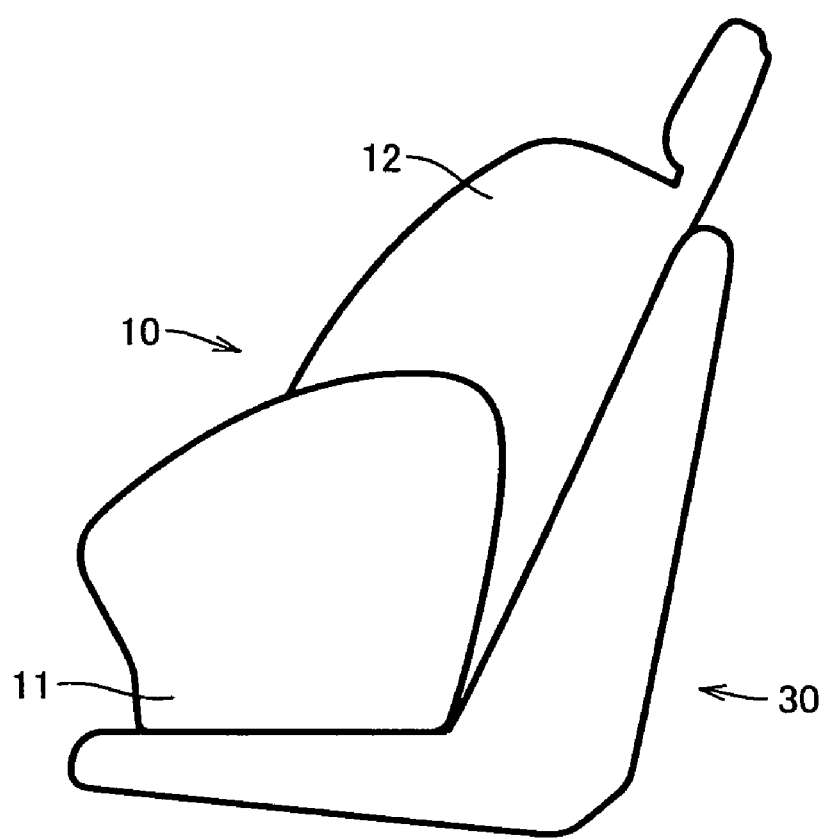
FIG. 5 is a schematic view showing a state in which the seat body is mounted on the base member in a forward-looking manner.

FIG. 1 shows a detachable child safety seat according to one embodiment of the present invention. A child safety seat 1 comprises a seat body 10 and a base member 30. The seat body 10 is detachably supported on the base member 30. FIGS. 1 and 5 show a state in which the seat body 10 is mounted on the base member 30 in a forward-looking manner.

Figure 6:
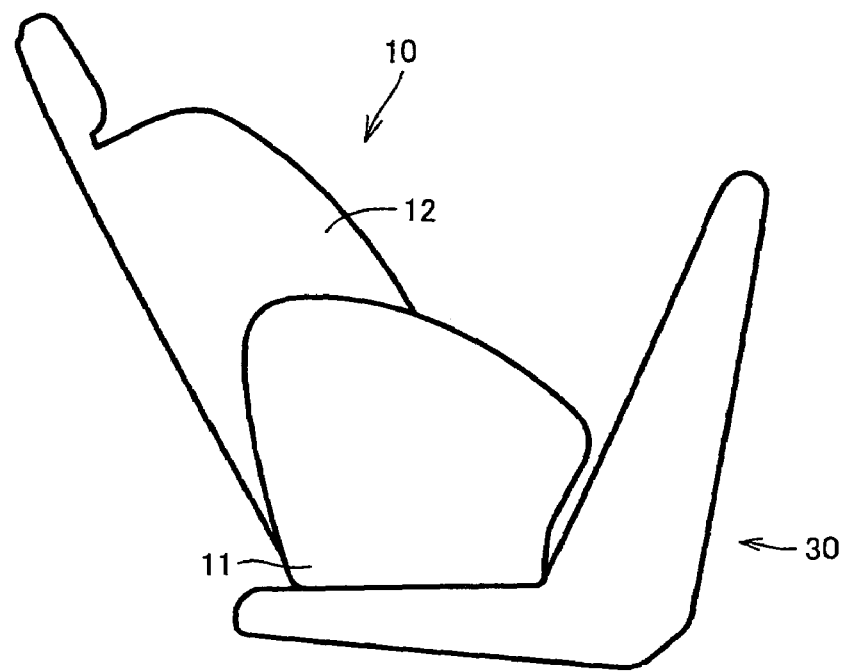
FIG. 6 is a schematic view showing a state in which the seat body is mounted on the base member in a backward-looking manner.
Figure 7:
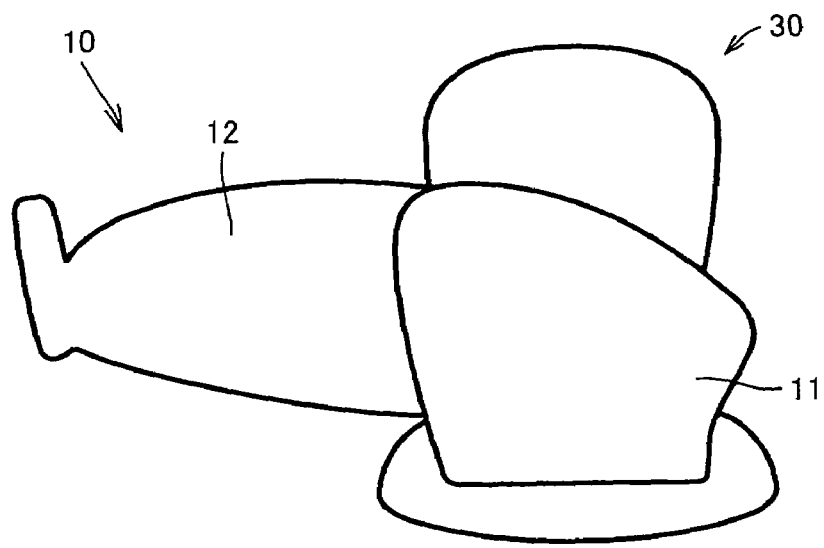
FIG. 7 is a schematic view showing a state in which the seat body is mounted on the base member in a sideway-looking manner.

FIG. 6 shows a state in which the seat body 10 is mounted on the base member 30 in backward-looking manner. FIG. 7 shows a state in which the seat body 10 is reclined backward and mounted on the base member 30 in a sideway-looking manner. The seat body 10 comprises a seat 11 and a backrest 12 provided so as to be reclined with respect to the seat 11. In the forward-looking mounted state shown in FIGS. 1 and 5, the backrest 12 is set at a minimum reclining angle. In the sideway-looking mounted state shown in FIG. 7, the backrest 12 is set at a maximum reclining angle so as to be in the form of a bed. In the backward-looking mounted state shown in FIG. 6, the backrest 12 is set at a middle reclining angle.

Figure 2:
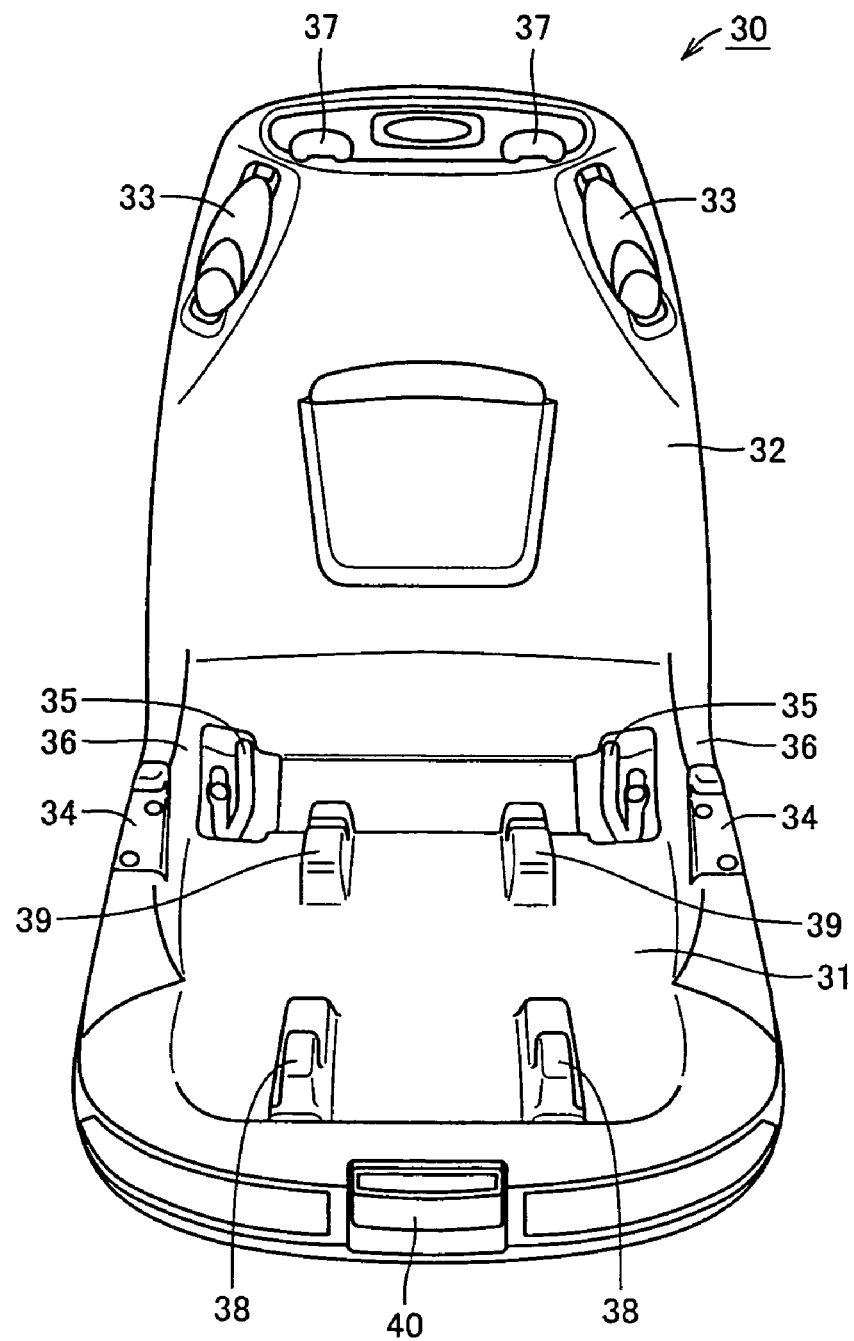
FIG. 2 is a front view showing a base member.

FIG. 2 shows the base member 30. As shown in FIG. 2, the base member 30 comprises a bottom wall 31 to support the seat 11 of the seat body 10 from beneath and a stand wall 32 rising from a rear end of the bottom wall 31 and extending upward.

On the bottom wall 31, two front catch clamps 38 and two rear catch clamps 39 to mount the seat body 10 is provided. The two front catch clamps 38 are arranged at the front of the bottom wall 31 and extend in a width direction. The two rear catch clams 39 are arranged at the rear of the bottom wall 31 and extend in the width direction. The front catch clamp 38 has an engagement recess which is cut forward from its rear end. The rear catch clamp 39 has an engagement recess which is cut downward. Although the two front catch clamps 38 and the two rear catch clams 39 are positioned apart from each other in the width direction in this illustrated embodiment, as another embodiment, one front catch clamp and one rear catch clamp may be provided so as to extend long in the width direction.

A part of an operation member 40 to release a fixed connection between the seat body 10 and the base member 30 is exposed at a front end of the bottom wall 31 of the base member 30. When the operation member 40 is drawn forward by a hand, the locked state between the seat body 10 and the base member 30 can be canceled. A structure related to this operation member 40 will be described in detail below.

As shown in FIG. 2, two belt clips 33 are mounted on an upper part of the stand wall 32 of the base member 30. The base member 30 has a side wall 36 extending upward from each side of the bottom wall 31, and a first belt guide member 34 is fixedly mounted on each side wall 36. In addition, a second belt guide member 35 having a U-shaped metal hook is exposed on each side of a rear region of the bottom wall 31.

Figure 8:
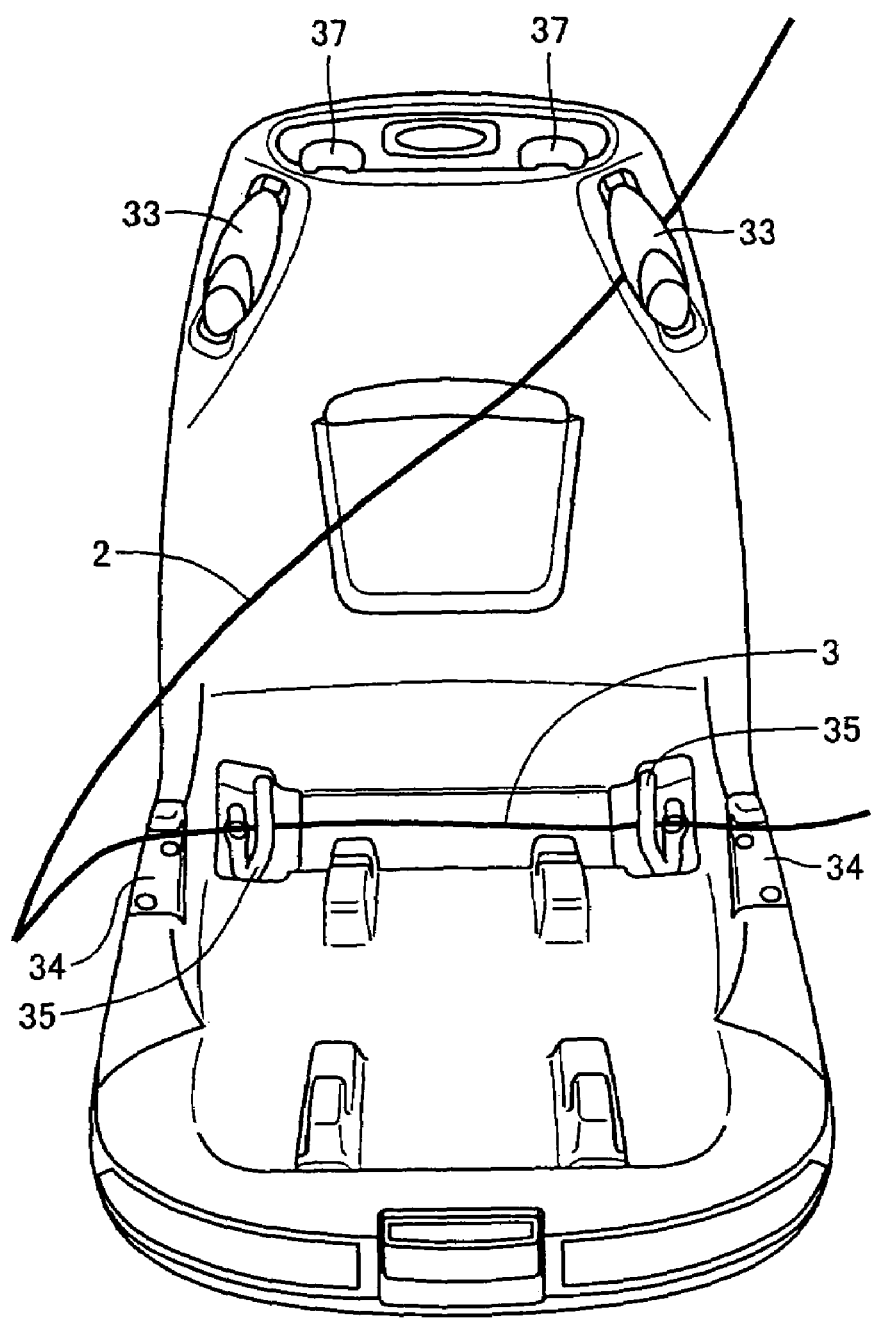
FIG. 8 is a view to explain how to mount a car mounted seat belt.

FIG. 8 is a view to explain how to mount the base member 30 on a seat of a car using a car mounted seat belt. As shown in FIG. 8, the car mounted seat belt comprises a shoulder belt part 2 and a waist belt part 3 in general. The shoulder belt part 2 is clipped and guided by the upper belt clip 33. The waist belt part 3 passes through the pair of first belt guide members 34 and the pair of second belt guide members 35. A shock can be well absorbed by way of this guided path of the waist belt part 3, which will be described in detail below.

As shown in FIGS. 2 and 8, two openings 37 are provided at an upper region of the stand wall 32 of the base member 30. A hook rod which engages with the backrest 12 of the seat body 10 comes out from the opening 37, which will be described in detail below.

Figure 3:
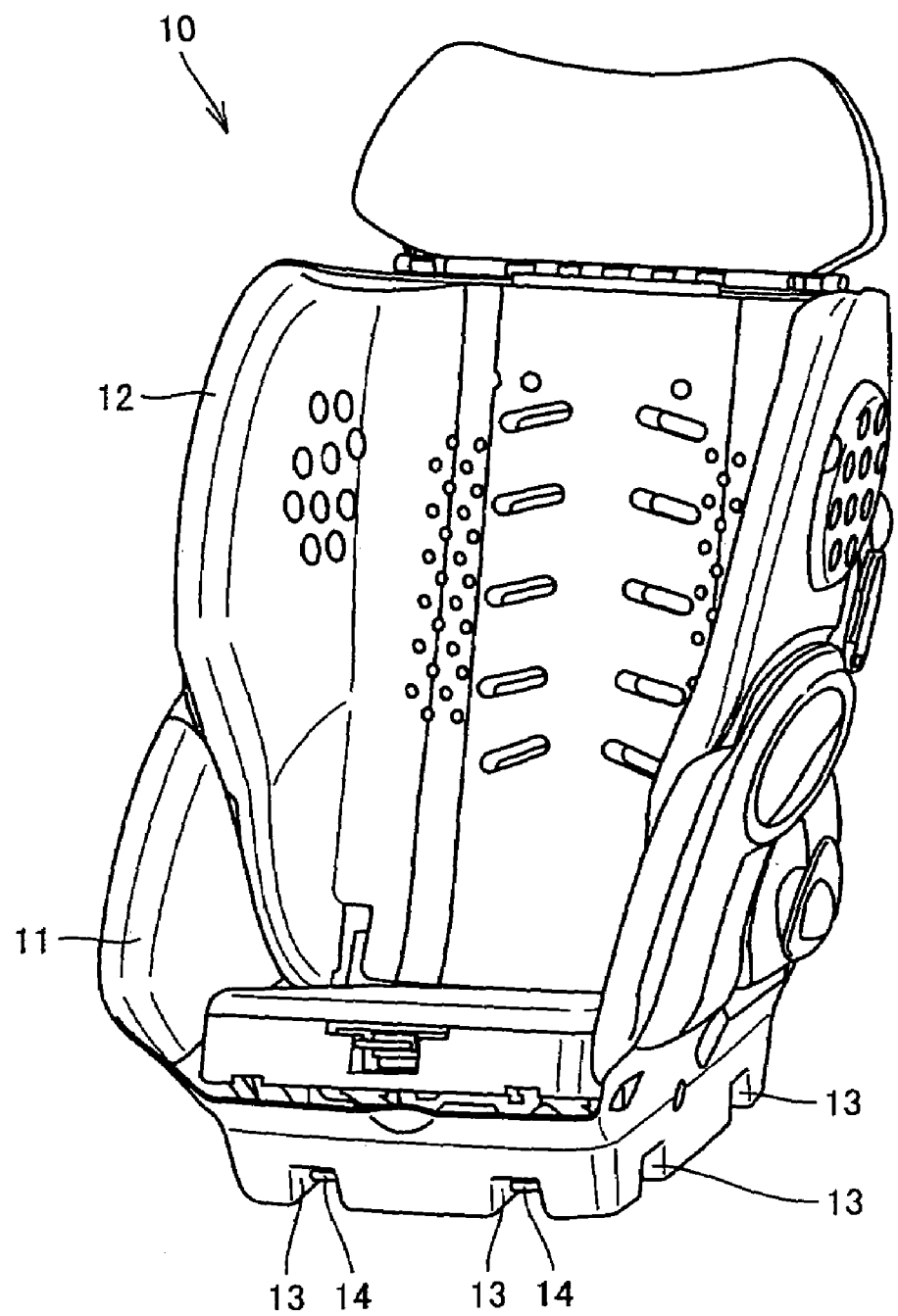
FIG. 3 is a perspective view showing a seat body.
Figure 4:
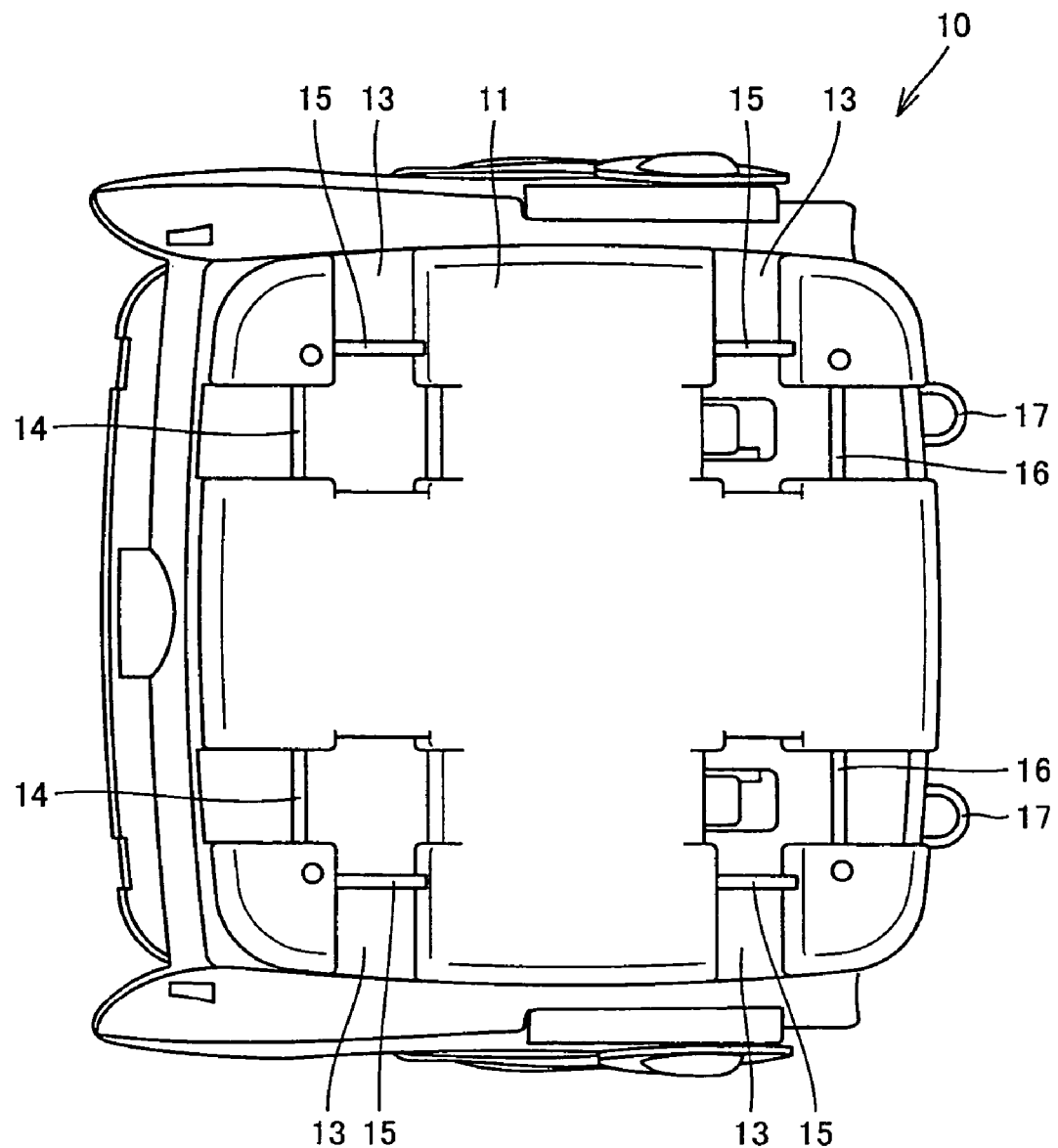
FIG. 4 is a bottom view showing the seat body.

FIG. 3 is a perspective view showing the seat body 10 and FIG. 4 is a bottom view thereof. As shown in FIG. 4, a bottom surface of the seat 11 of the seat body 10 has almost a square configuration and an L-shaped groove 13 is formed in the vicinity of each of four corners. Seat body side engagement members which engage with the above front catch clamps 38 and rear catch clamps 39 of the base side engagement members are provided at the four L-phased grooves 13.

More specifically, the seat body side engagement members comprise a front engagement rod 14 positioned at the front and extending in the width direction, a rear engagement rod 16 positioned at the rear and extending in the width direction, and a pair of side engagement rods 15 positioned at both sides and extending forward and backward direction.

Each of the engagement rods 14, 15 and 16 may be one long linear rod so as to be continuously provided across the two grooves 13 or may be two short linear rods so as to be provided at each groove 13. Alternatively, the front engagement rod 14, the side engagement rod 15 and the rear engagement rod 16 may be connected to each other to be a long L-shaped, U-shaped or rectangular rod. In any case, the rod provided at the groove 13 serves as the seat body side engagement members which engage with the above base side engagement members.

The front engagement rod 14, the pair of side engagement rods 15 and the rear engagement rod 16 constituting the seat body side engagement members are provided so as to extend along sides of the square substantially.

Figure 11:
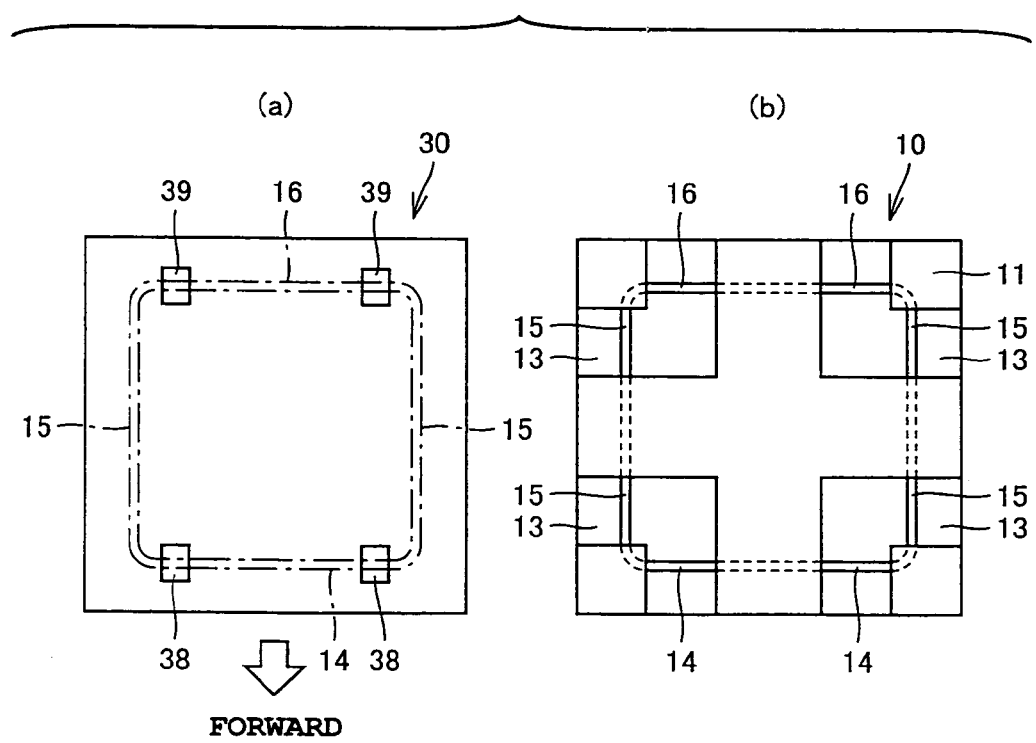
FIG. 11 is a view showing an upper surface of the base member and a bottom surface of the seat body in line.

Next, three patterns of the fixed connection between the seat body 10 and the base member 30 will be described with reference to FIG. 11. FIG. 11 shows the base member 30 (FIG. 11(a)) and the bottom surface of the seat body 10 (FIG. 11(b)). As shown in FIG. 11, the two front catch clamps 38 and the two rear catch clamps 39 are provided in the base member 30. Meanwhile, the front engagement rod 14 and the pair of side engagement rods 15 and the rear engagement rod 16 are provided on the bottom surface of the seat body 10.

When the seat body 10 is set on the base member 30 in the forward-looking manner, the front engagement rod 14 engages with the front catch clamp 38, and the rear engagement rod 16 engages with the rear catch clamp 39. When the seat body 10 is set on the base member 30 in the backward-looking manner, the rear engagement rod 16 engages with the front catch clamp 38, and the front engagement rod 14 engages with the rear catch clamp 39. When the seat body 10 is set on the base member 30 in the sideway-looking manner, the pair of side engagement rods 15 engages with the front catch clamp 38 and the rear catch clamp 39, respectively.

A mechanism to lock the fixed connection between the seat body 10 and the base member 30 will be described with reference to FIGS. 10 to 20.

Figure 12:
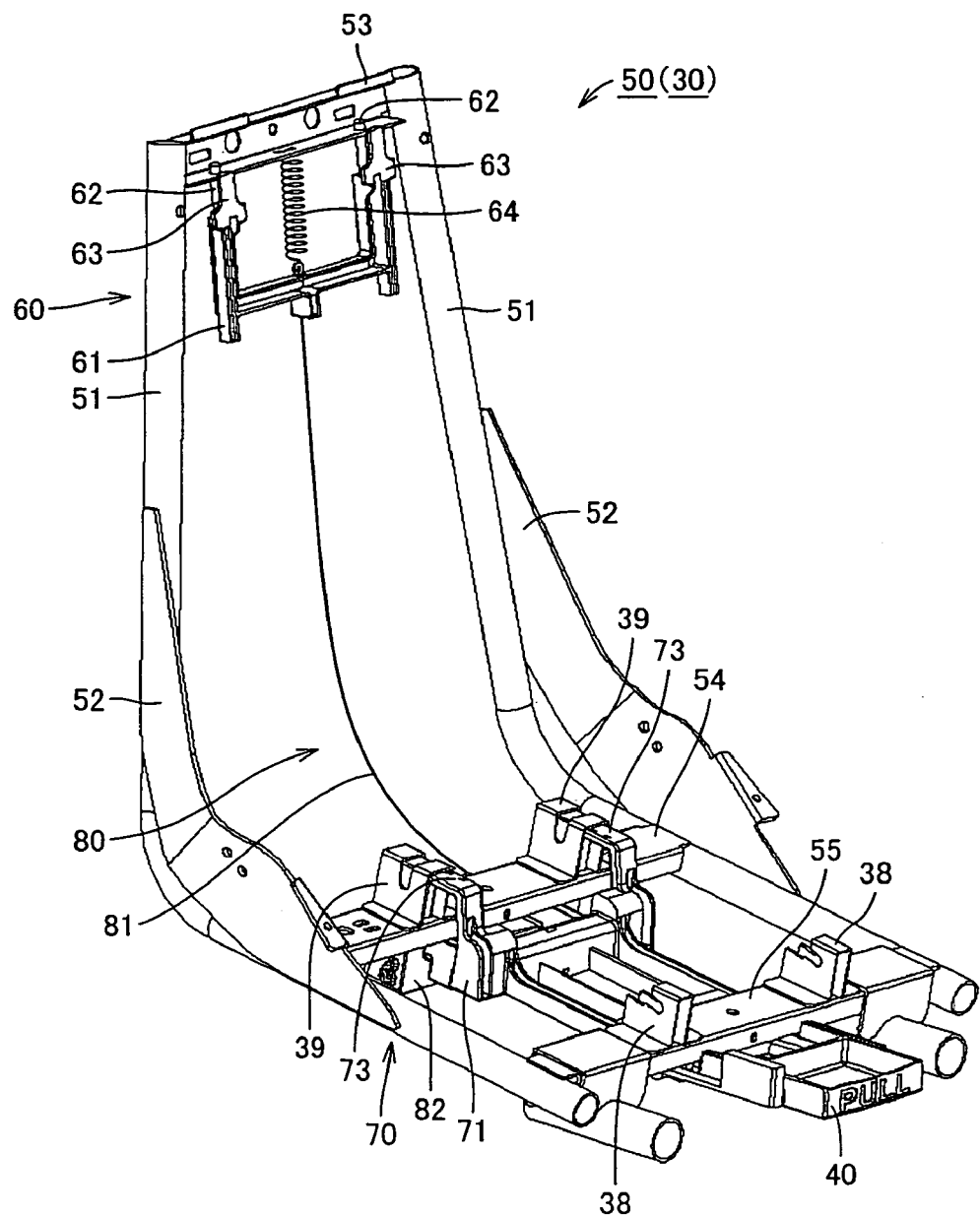
FIG. 12 is an oblique perspective view showing a frame structure body of the base member from above.
Figure 13:
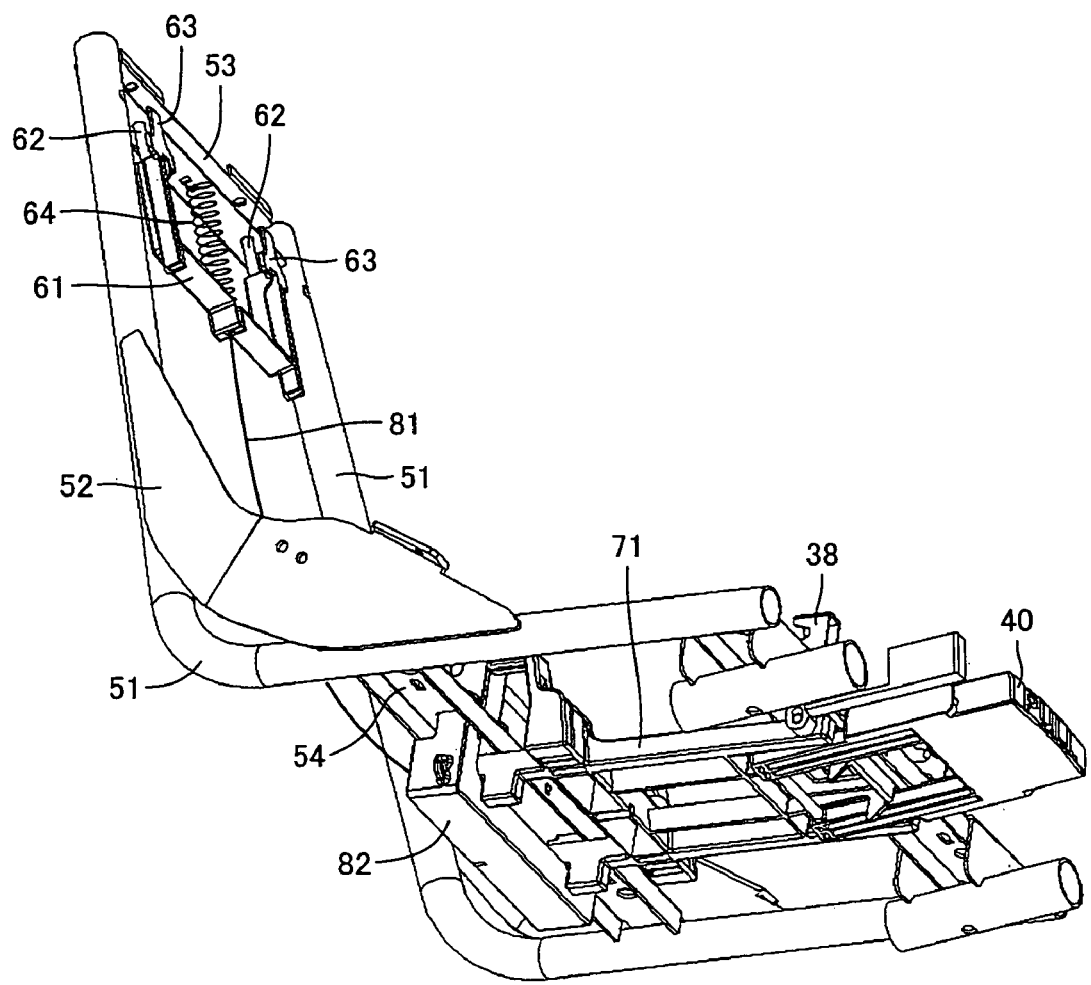
FIG. 13 is an oblique perspective view showing the frame structure body of the base member from beneath.

FIGS. 12 and 13 show a frame structure body 50 of the base member 30 which is entirely covered with a resin material. The frame structure body 50 is rigid and comprises a pair of L-shaped metal bar members 51 positioned on both sides, and width-direction connection members 53, 54 and 55 which connect the pair of bar members 51 as fundamental components. The above-described front catch clamps 38 are fixed on the width-direction connection member 55 positioned at the forefront, and the rear catch clamps 39 are fixed on the width-direction connection member 54 positioned at the middle part.

The detachable child safety seat comprises an upper locking mechanism 60, a lower locking mechanism 70 and a synchronization mechanism 80. The upper locking mechanism 60 locks or unlocks the connection between the stand wall 32 of the base member 30 and the backrest 12 of the seat body 10. The lower locking mechanism 70 locks or unlocks the connection between the bottom wall 31 of the base member 30 and the seat 11 of the seat body 10. The synchronization mechanism 80 connects the upper locking mechanism 60 to the lower locking mechanism 70 and synchronizes the locked states or unlocked states of both locking mechanisms and comprises a wire 81 as one component.

The upper locking mechanism 60 comprises a rod holder 61 supported by the stand wall 32 of the base member 30 so as to be displaced vertically, a hook rod 62 fixedly held by the rod holder 61, a pair of display pieces 63 fixedly held by the rod holder 61, and a spring 64 to force the rod holder 61 to move upward, as components which are mounted on the side of the base member 30. Here, the hook rod 62 functions as a lift member which engages with an engaged member of the seat body to be described below.

The pair of hook rods 62 can pass through holes provided in the width-direction connection member 53 and protrude upward. In the states shown in FIGS. 12 and 13, the hook rod 62 is at a lower position, so that it does not protrude from the width-direction connection member 53.

The pair of display pieces 63 are plates having a noticeable color, and moved vertically together with the hook rod 62. This pair of display pieces 63 is provided to confirm whether locking is surely made or not.

Figure 10:
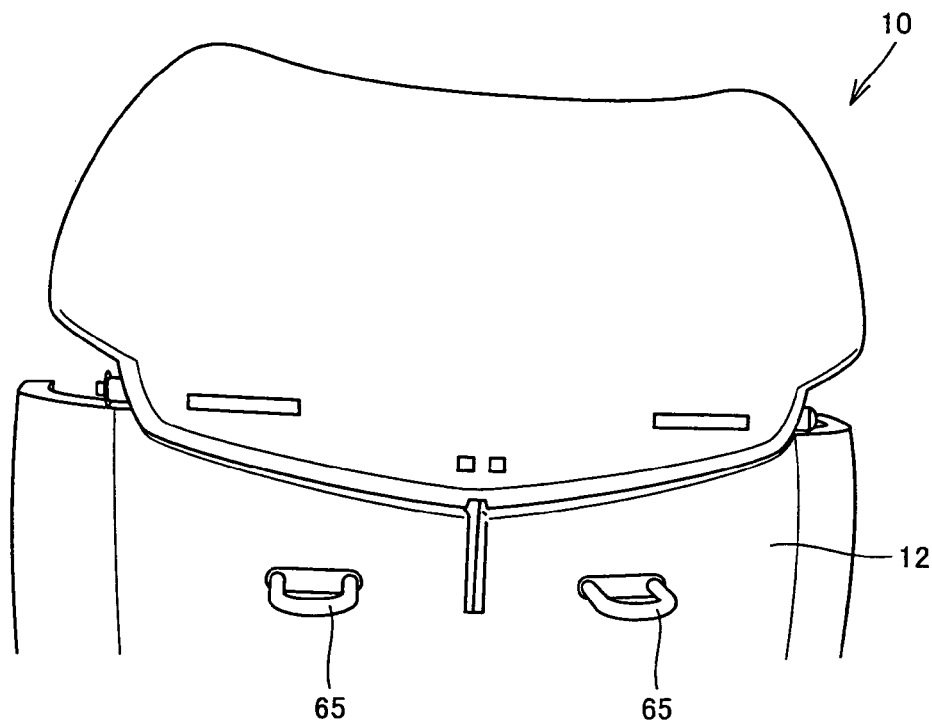
FIG. 10 is a view showing an upper part of a back surface of a backrest of the seat body.

The upper locking mechanism 60 comprises a pair of hook rings 65 shown in FIG. 10 as components mounted on the side of the seat body 10. The hook ring 65 is provided on the back side of the backrest 12 of the seat body 10. The hook ring 65 functions as an engaged member which receives the lift member (hook rod 62) of the base member to be engaged.

As shown in FIG. 2, the pair of openings 37 is provided at the upper end of the stand wall 32 of the base member 30. When the seat body 10 is mounted on the base member 30 in the forward-looking manner, the hook ring 65 of the seat body 10 enters the opening 37. In this state, when the hook rod 62 is brought to the upper position, the hook rod 62 fits in the hook ring 65 and the stand wall 32 of the base member 30 and the backrest 12 of the seat body 10 are locked.

When the seat body 10 is mounted on the base member 30 in the backward-looking manner or in the sideway-looking manner, the hook rod 62 and the hook ring 65 are not used. In this case, when the display piece 63 is brought to the upper position together with the hook rod 62, the display piece 63 can be viewed from the opening 37. The fact that the display piece 63 can be seen from the opening 37 means that the locking is surely made by the lower locking mechanism 70. When the locking by the lower locking mechanism 70 is not perfect, the display piece cannot be seen from the opening 37.

Next, a concrete structure of the lower locking mechanism 70 will be described with reference to FIGS. 12 to 14 mainly.

The lower locking mechanism 70 comprises the rear catch clamp 39 fixed on the width-direction connection member 54, and a locking member 71 which can be displaced in the forward and backward direction so as to cross an engagement hole of the rear catch clamp 39 as components mounted on the base member 30. In addition, the lower locking mechanism 70 comprises the engagement rods 14, 15 and 16 as components mounted on the side of the seat body 10. The rear engagement rod 16 is used as a representative example in describing the operation of the locking mechanism.

The locking member 71 has a pair of engagement plates 73 projecting backward and when the engagement plates 73 are brought to the rear position, they are positioned above the rear engagement rod 16 fitted in the engagement hole of the rear catch clamp 39, whereby the engagement between the rear catch clamp 39 and the rear engagement rod 16 is locked.

The wire 81 serving as one component of the synchronization mechanism 80 connects the rod holder 61 to the locking member 71. Therefore, the locking member 71 is constantly forced toward the engagement direction by the force of the spring 64.

As shown in FIGS. 12, 13, 14 and 20, the synchronization mechanism 80 comprises a stopper member 82 supported on the base member 30 and can be displaced between an upper position and a lower position, and a spring 83 serving as an elastic member which forces the stopper member 82 upward.

Figure 14:
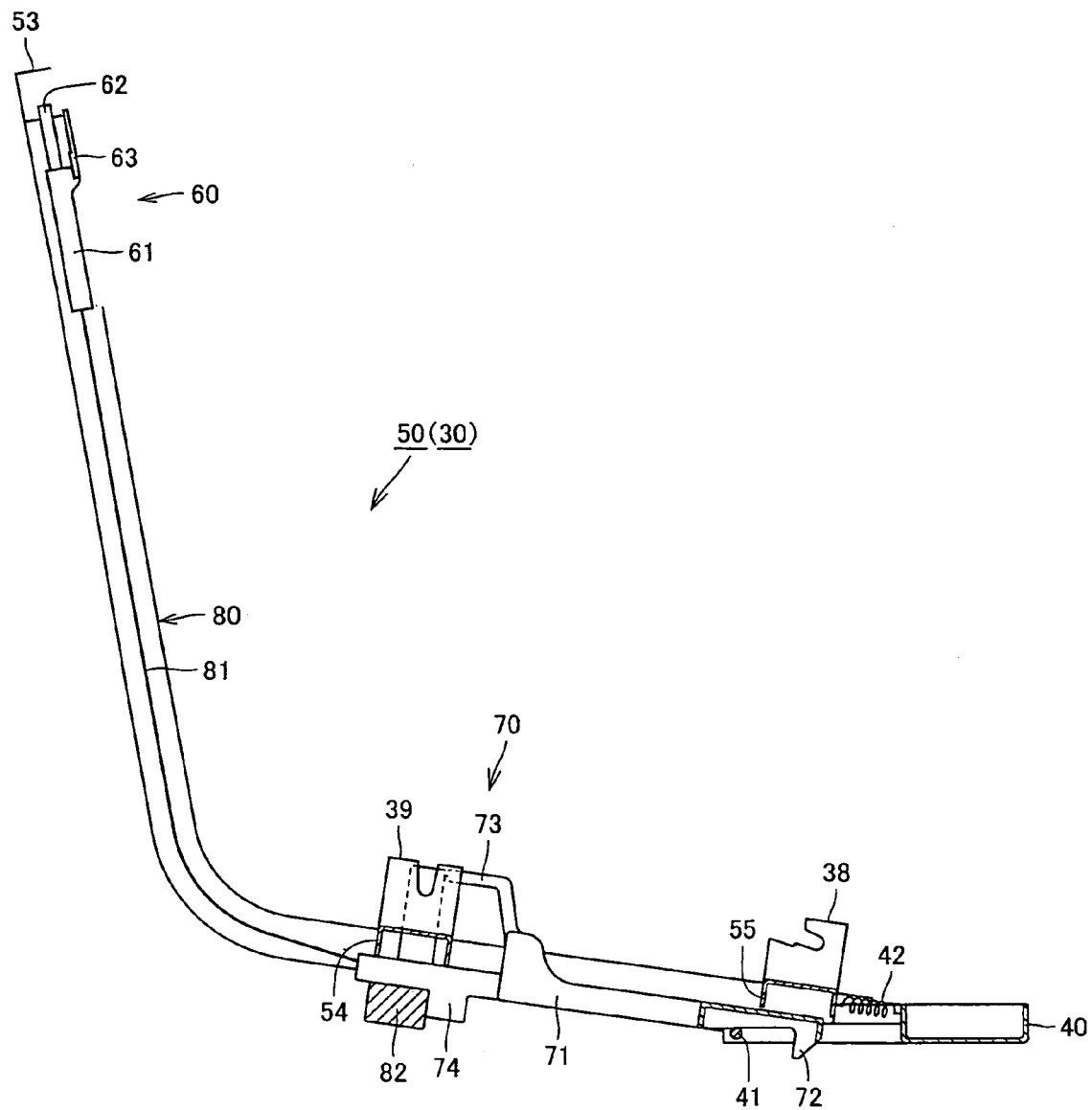
FIG. 14 is a side view showing the frame structure body in a state before the seat body is mounted.

The spring 83 is not shown in FIGS. 12 to 14. An upper part of the stopper member 82 is inserted in the rear catch clamp 39 through the width-direction connection member 54. In addition, the spring 83 connects each side of the stopper member 82 to the width-direction connection member 54. When the stopper member 82 is brought to the upper position by the force of the spring 83, the upper end of the stopper member 82 abuts on a back surface of an upper wall of the rear catch clamp 39.

As shown in FIG. 14, the locking member 71 which can be displaced in the forward and backward direction has a lower projection 74 having a rectangular section. When the stopper member 82 is brought to the upper position, the rear wall surface of the lower projection 74 of the locking member 71 abuts on the stopper member 82, so that backward movement of the locking member 71 is prevented and upward movement of the rod holder 61 which is connected through the wire 81 is also prevented.

The operation member 40 whose one part is exposed to the front end of the base member 30 is also one component of the synchronization mechanism 80. As shown in FIG. 14, the operation member 40 is forced backward by an extension spring 42 of the operation member 40 and an engagement shaft 41 is provided at its rear end. The locking member 71 has an engagement click 41 at its front end. When the locking member 71 is moved backward, the engagement click 41 engages with the engagement shaft 41. The operation member 40 brings the locking member 71 to a locking cancel position.

Operations of the upper locking mechanism 60, the lower locking mechanism 70 and the synchronization mechanism 80 will be described with reference to FIGS. 14 to 18.

FIG. 14 shows a state in which the seat body 10 is not mounted on the base member 30. In this state, the upper end of the stopper member 82 abuts on the back side of the upper wall of the rear catch clamp 39, and the locking member 71 abuts on the stopper member 82, so that it is prevented from being moved backward. In addition, the rod holder 61, the hook rod 62 and the display piece 63 are at the lower positions.

Figure 15:
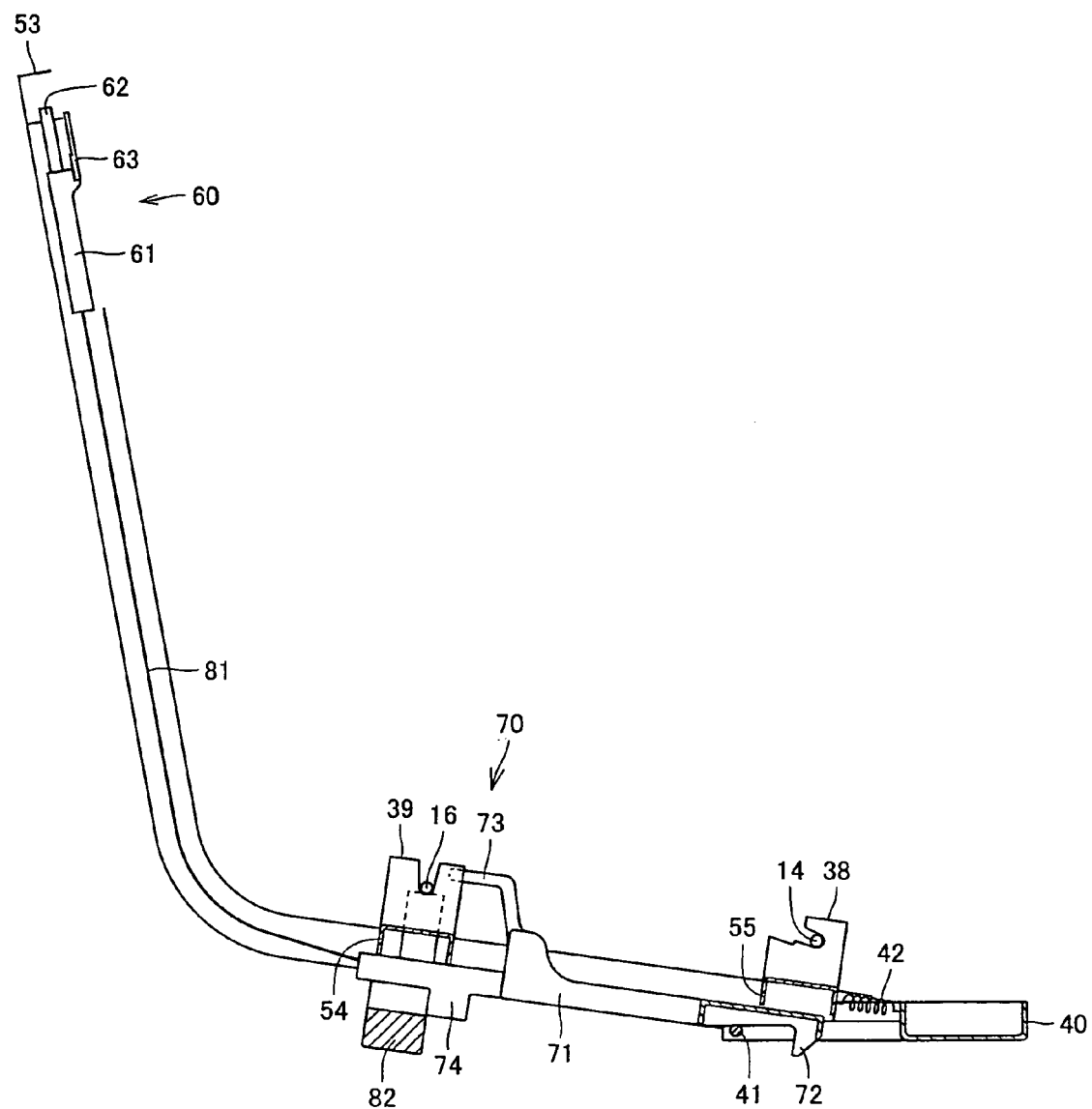
FIG. 15 is a side view showing the frame structure body in a state a rear engagement rod of the seat body is lowered.

FIG. 15 shows a state in which the front engagement rod 14 of the seat body 10 is positioned in the engagement recess of the front catch clamp 38 and the rear engagement rod 16 is positioned in the engagement recess of the rear catch clamp 39 and brought to the lower position. The stopper member 82 is lowered by the rear engagement rod 16 and brought to the lower position in which the locking member 71 can be moved backward.

Figure 16:
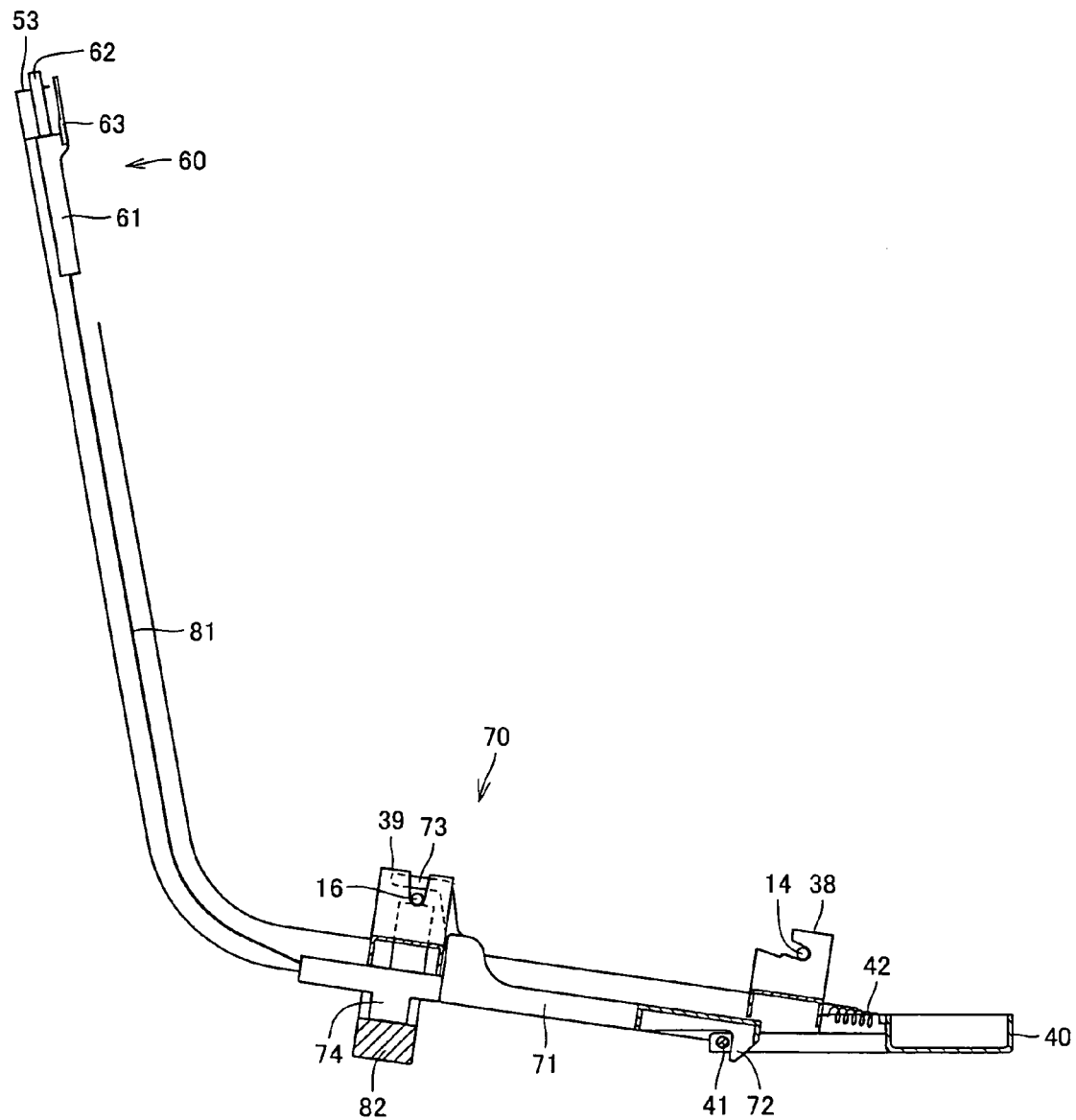
FIG. 16 is a side view showing the frame structure body in a state the seat body is fixed.

Thus, as shown in FIG. 16, by the extension force of the spring 64 (refer to FIG. 12), the rod holder 61 is brought to the upper position and the locking member 71 connected to the rod holder 61 through the wire 81 is brought to the backward position and the engagement plate 73 is positioned above the rear engagement rod 16. When the engagement state between the engagement plate 73 of the locking member 71 and the rear engagement rod 16 is locked, the connection state between the bottom wall 31 of the base member 30 and the seat 11 of the seat body 10 is locked. In this state, the stopper member 82 abuts on the bottom surface of the lower projection 74 of the locking member 71 and held at the lower position.

In conjunction with the locking operation of the lower locking mechanism 70 as described above, the hook rod 62 is also moved upward and fits in the hook ring 65 of the seat body 10, so that the connection state between the stand wall 32 of the base member 30 and the backrest 12 of the seat body 10 is locked also. The locking states of the upper locking mechanism 60 and the lower locking mechanism 70 are strongly held by the force of the spring 64.

Figure 17:
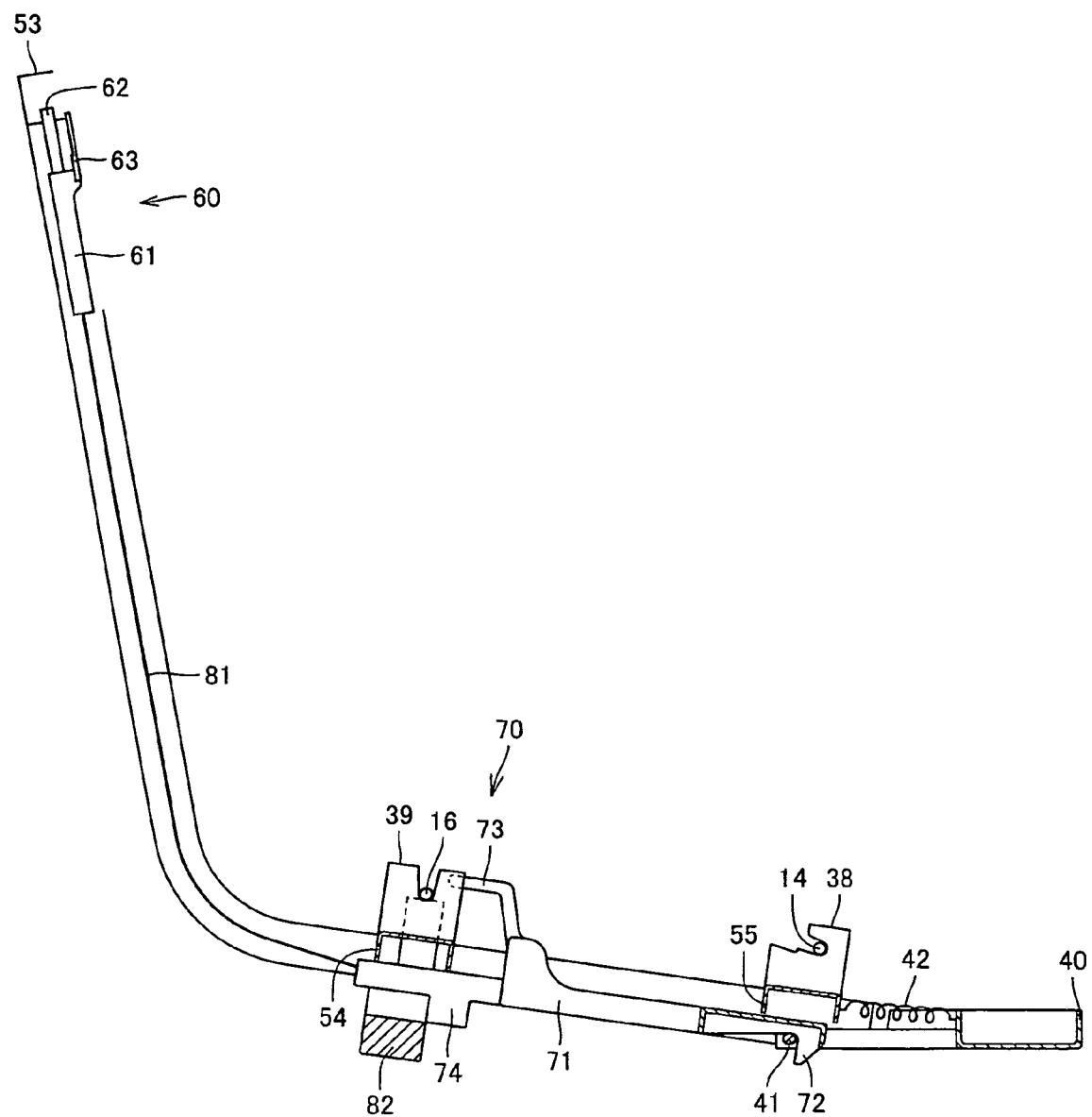
FIG. 17 is a side view showing the frame structure body in a state the seat body is being unlocked.

When the seat body 10 is dismounted from the base member 30, as shown in FIG. 17, the operation member 40 is drawn forward. Then, the engagement shaft 41 of the operation member 40 engages with the engagement click 72 of the locking member 71, so that the locking member 71 is moved forward.

Figure 18:
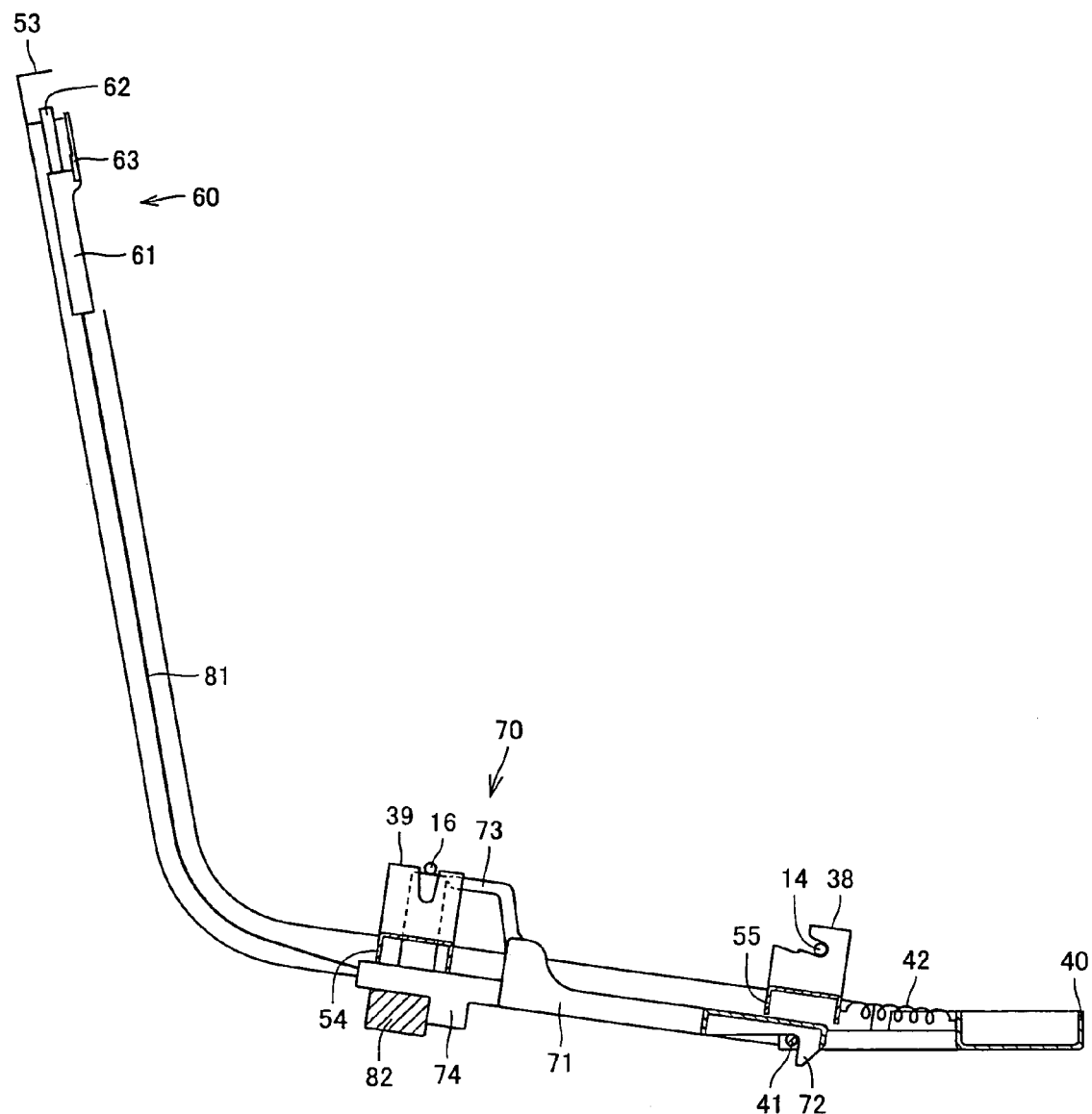
FIG. 18 is a side view showing the frame structure body in a state the rear engagement rod is pushed upward.

In the state shown in FIG. 17, the engagement plate 73 of the locking member 71 is moved forward and an upper part of the rear engagement rod 16 is opened. In addition, in conjunction with the forward movement of the locking member 71, the abutment state between the bottom surface of the lower projection 74 of the locking member 71 and the stopper member 82 is removed and the stopper member 82 is allowed to be moved upward. Therefore, as shown in FIG. 18, the stopper member 82 is moved upward by the force of the spring 83 (refer to FIG. 20) and the rear engagement rod 16 is pushed upward from the rear catch clamp 39. Thus, the fixed connection state between the bottom wall 31 of the base member 30 and the seat 11 of the seat body 10 is released. In addition, the operation member 40 is returned to the original position by the force of the extension spring 42.

When the locking member 71 is moved forward by the operation of the operation member 40, the hook rod 62 connected to the locking member 71 through the wire 81 is lowered and retreated in the width-direction connection member 53. As a result, the connection between the hook rod 62 and the hook ring 65 is disengaged and the fixed connection state between the stand wall 32 of the base member 30 and the backrest 12 of the seat body 10 is disengaged.

Figure 19:
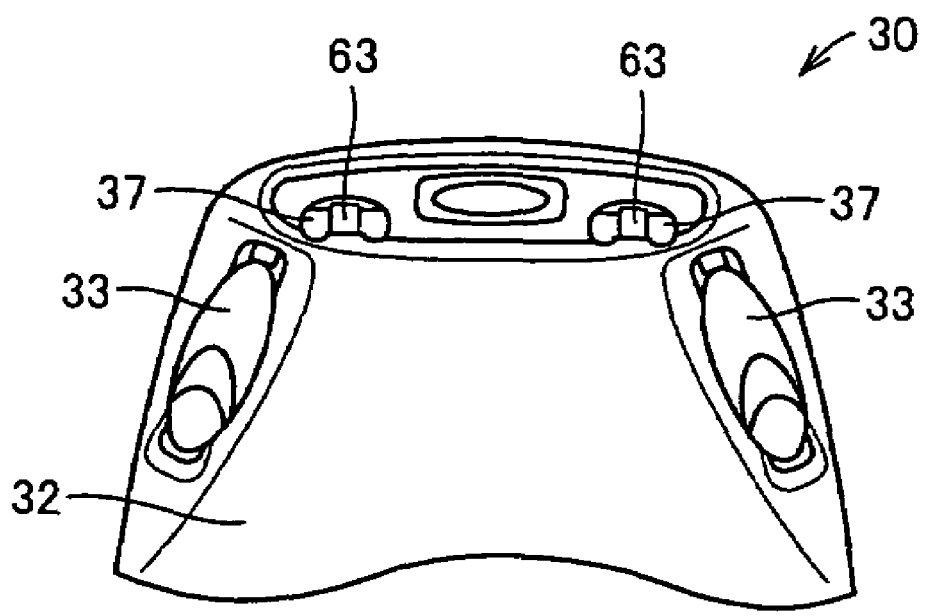
FIG. 19 is a front view showing an upper end of a stand wall of the base member.
Figure 20:
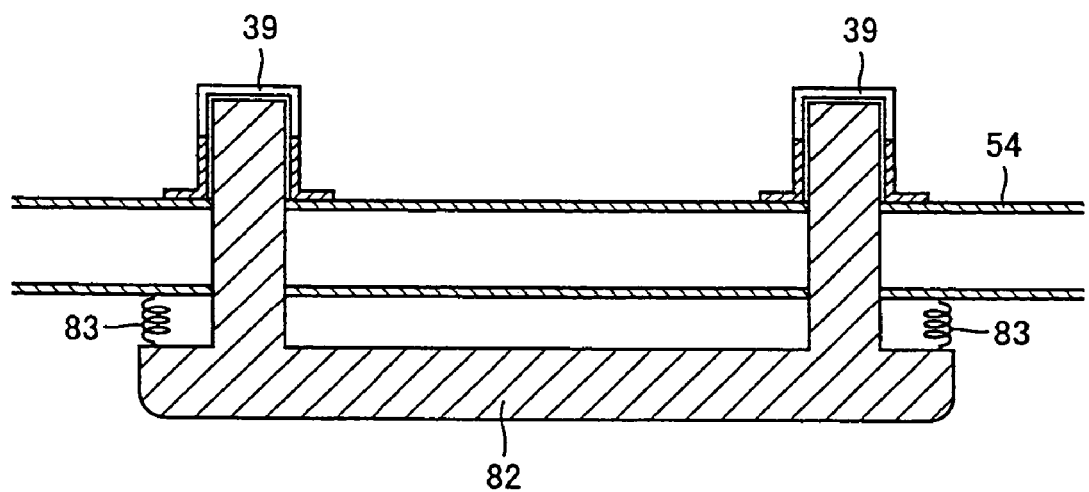
FIG. 20 is a schematic sectional view showing a state in which an upper end of a stopper member is inserted in a rear catch clamp.

FIGS. 14 to 18 show an example in which the seat body 10 is mounted on the base member 30 in the forward-looking manner. When the seat body 10 is mounted on the base member 30 in the sideway-looking or backward-looking manner, the hook rod 62 does not fit in the hook ring 65. In this case, as shown in FIG. 19, when the lower locking mechanism 70 is surely in the locked state, the display piece 63 can be seen from the opening 37 provided at the upper end of the stand wall 32 of the base member 30. When the display piece cannot be clearly observed, it can be recognized that the locking state of the lower locking mechanism 70 is not perfect, which is preferable in view of safety.

Figure 21:
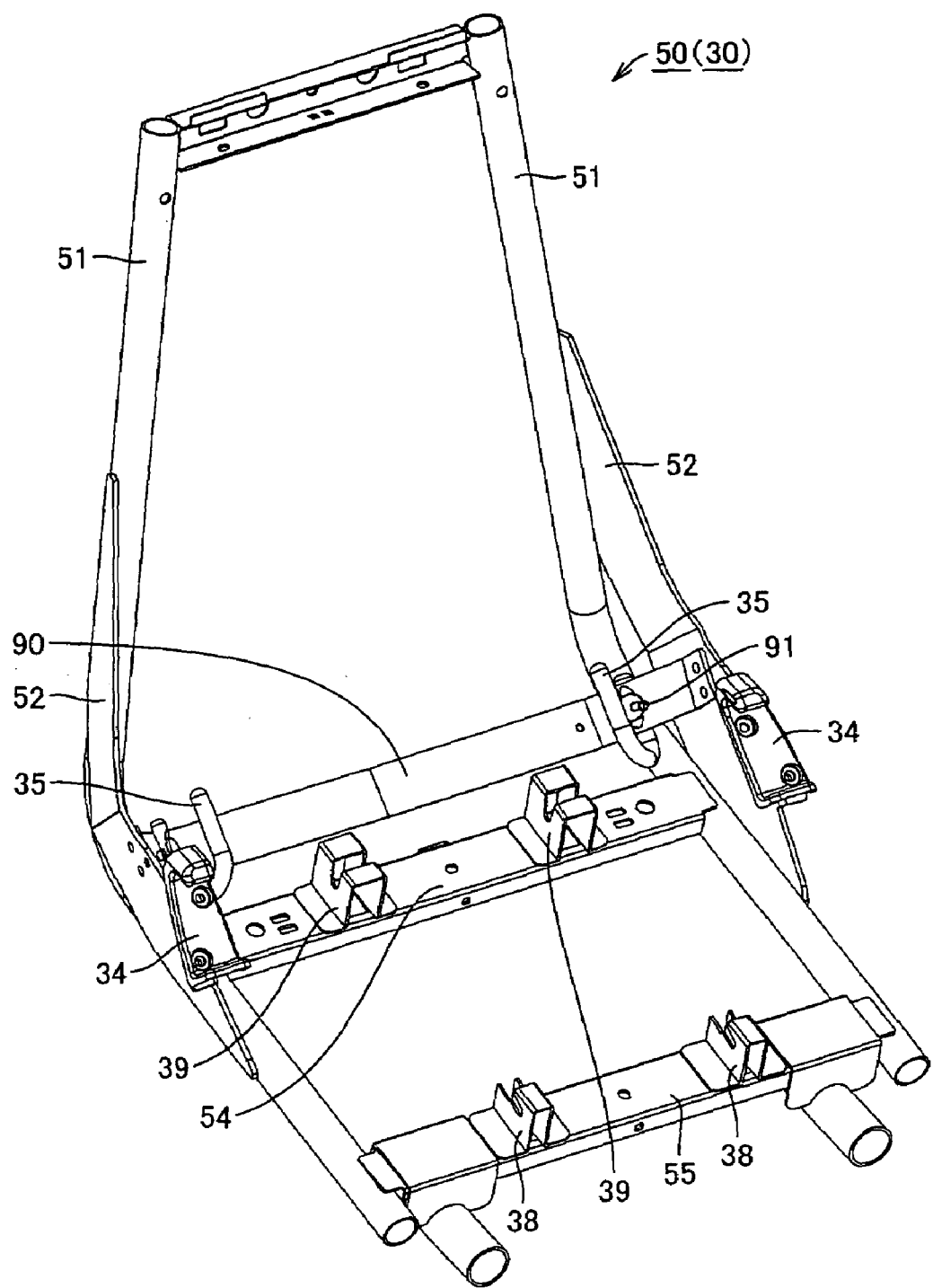
FIG. 21 is a perspective view showing a frame structure body having a shock absorbing structure.
Figure 22:
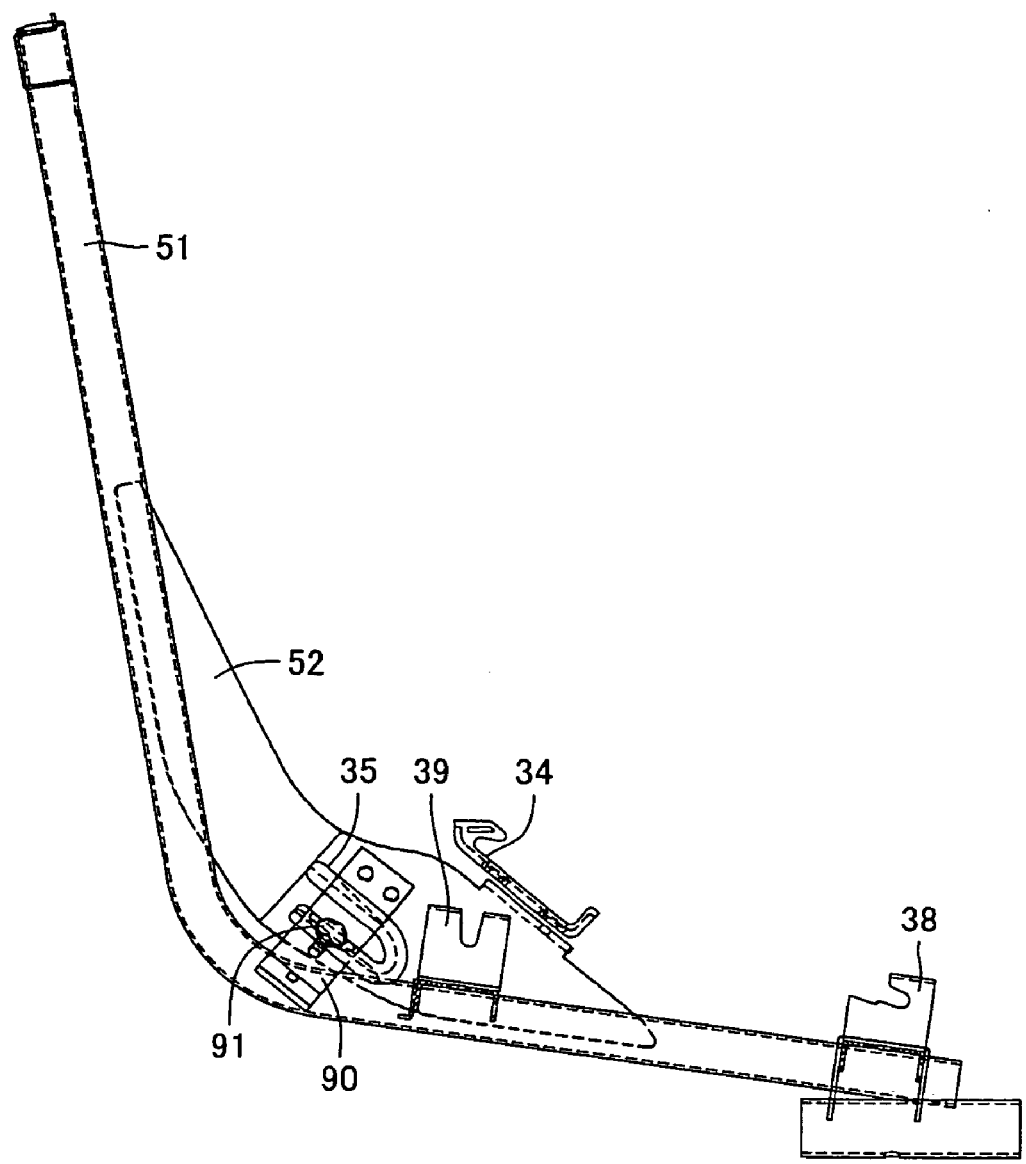
FIG. 22 is a side view showing the frame structure body having the shock absorbing structure.
Figure 23:
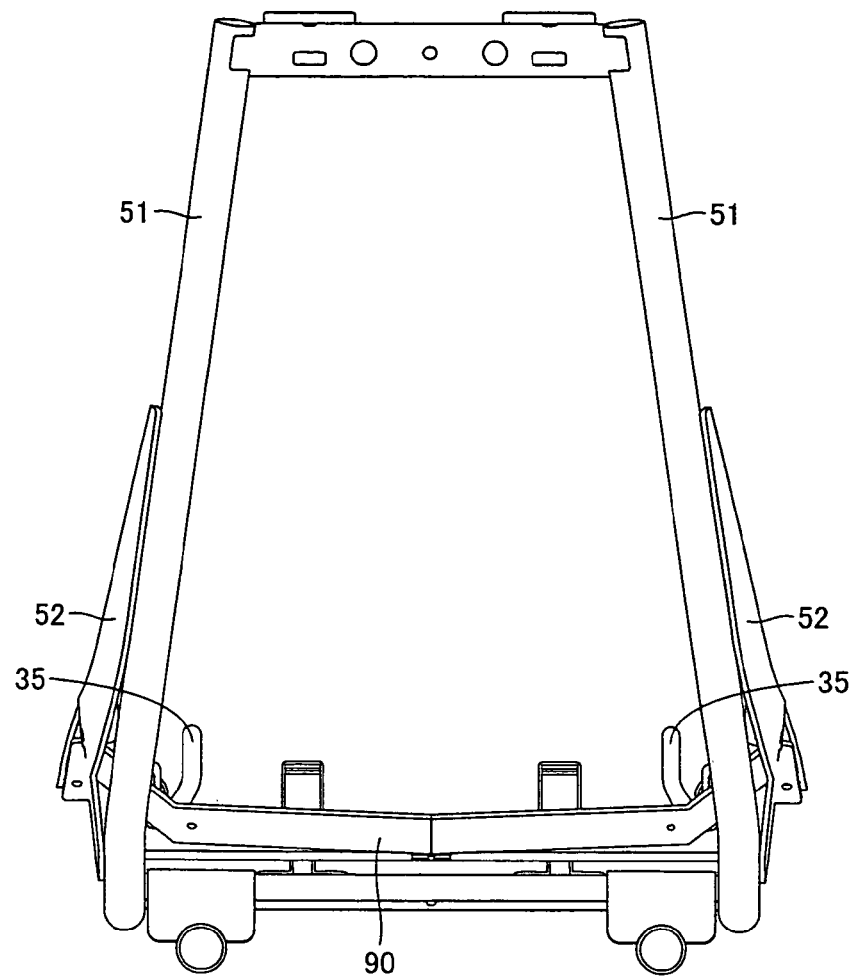
FIG. 23 is a back view showing the frame structure body having the shock absorbing structure.
Figure 24:
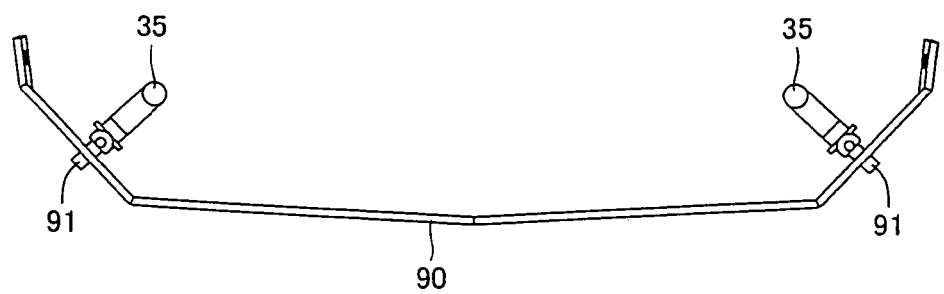
FIG. 24 is a plan view showing a metal band on which a second belt guide member is mounted.

A shock absorbing structure will be described in detail with reference to FIGS. 21 to 24. As shown in FIG. 21, the base member 30 comprises the rigid frame structure body 50. The pair of first belt guide members 34 through which the car mounted waist belt is fixed onto metal side plates 52 positioned both sides of the frame structure body 50. Both ends of a metal band 90 are fixed to the metal side plates 52. The second belt guide members 35 having the U-shaped metal hook configuration is fixed to both side regions of the metal band 90 through a fixed shaft 91. Therefore, the pair of first second belt guide members 35 is positioned inside the pair of first guide members 34.

As described above with reference to FIG. 8, the waist belt part 3 of the car mounted seat belt passes through both pair of first belt guide members 34 and pair of second belt guide members 35 to fix the base member 30 on the car seat. For example, in case of a car crash, the base member 30 is likely to be moved forward and its shock load is applied from the waist belt part 3 to the second belt guide members 35. Since the second belt guide member 35 is fixed onto the metal band 90, when the shock load is applied to the second belt guide member 35, the metal band 90 is bent and plastically deformed. When the metal band 90 is plastically deformed, since the shock load applied to the base member 30 is absorbed to some extent, the shock load applied to a child sit on the child safety seat can be reduced.

Figure 9:
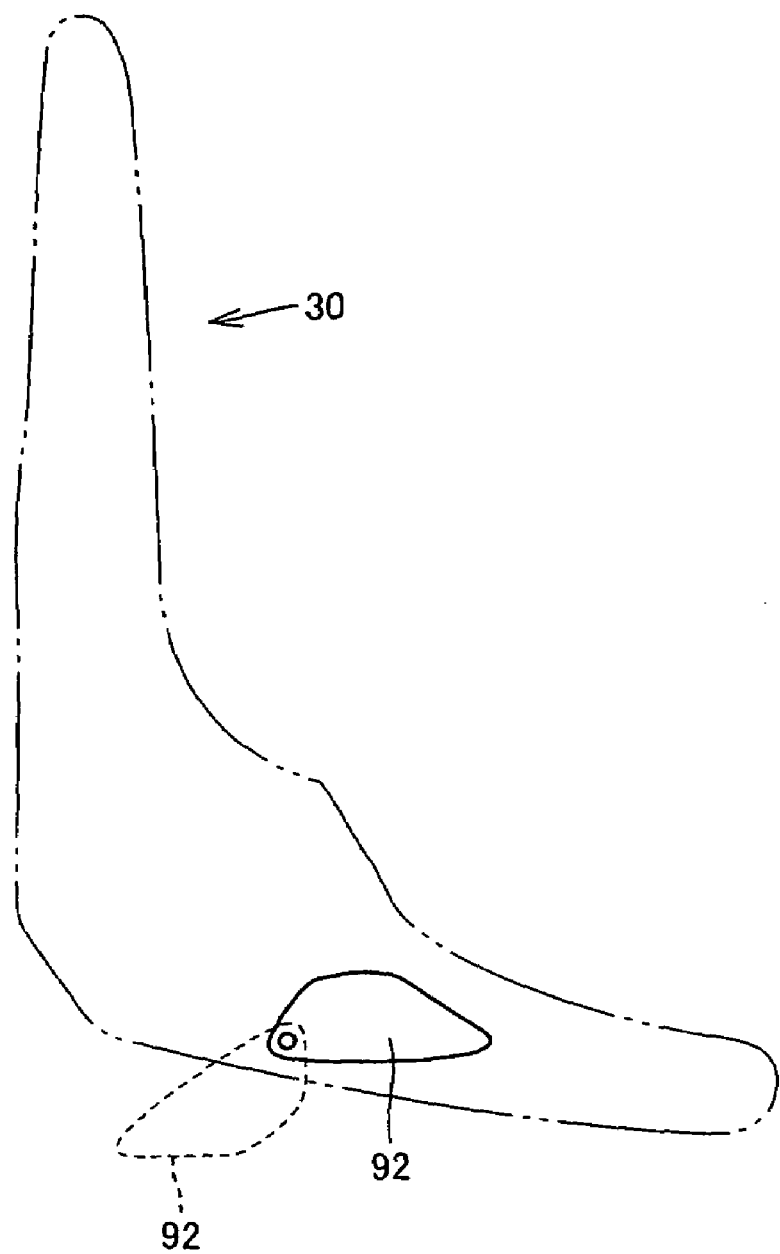
FIG. 9 is a view showing an outline of the base member.

FIG. 9 is a side view showing an outline of the base member 30. As shown in FIG. 9, the base member 30 preferably comprises an inclination adjustment member 92 which can be moved between a position in which it protrudes downward from the bottom surface and a position in which it is retreated in the bottom surface. The illustrated inclination adjustment member 92 is held by the base member 30 so that it can pivot. For example, when the rear part of the car seat largely falls, the inclination adjustment member 92 is protruded and the base member 30 is fixed on the car seat.

Although the embodiments of the present invention have been described with reference to the drawings in the above, the present invention is not limited to the above-illustrated embodiments. Various kinds of modifications and variations may be added to the illustrated embodiments within the same or equal scope of the present invention.

The present invention can be advantageously applied to the detachable child safety seat whose seat body and base member are detachable.

What is claimed is:

1. A detachable child safety seat comprising:
   a base member having a bottom wall and a stand wall rising from a rear end of the bottom wall and extending upward;
   a seat body having a seat and a backrest and being mounted on said base member detachably;
   an upper locking mechanism to lock or unlock the stand wall of said base member and the backrest of said seat body;
   a lower locking mechanism to lock or unlock the bottom wall of said base member and the seat of said seat body; and
   a synchronization mechanism to connect said upper locking mechanism to the lower locking mechanism and synchronize locked states or unlocked states of both locking mechanisms;
   wherein:
   a base side front engagement member extending in a width direction at a front position, and a base side rear engagement member extending in the width direction at a rear position are provided in said base member,
   a seat body side engagement member extending along a side of a square substantially and engaging with said base side front engagement member or said base side rear engagement member is provided in a bottom surface of said seat of said seat body;
   said base side front engagement member comprises two front catch clamps positioned apart from each other in the width direction,
   said base side rear engagement member comprises two rear catch clamps positioned apart from each other in the width direction, and
   said seat body side engagement member comprises a front engagement rod positioned at the front and extending in the width direction, a rear engagement rod positioned at the rear and extending in the width direction, and a pair of side engagement rods positioned at both sides and extending in the forward and backward direction.

2. The detachable child safety seat according to claim 1, wherein
   said upper locking mechanism comprises a lift member which is supported on the stand wall of said base member and can be displaced in the vertical direction, and an engaged member which is provided on a back surface of the backrest of said seat body so as to be engaged with said lift member when said lift member is brought to an upper position, and said synchronization mechanism comprises a connection member to connect said lift member to said lower locking mechanism.

3. The detachable child safety seat according to claim 2, wherein said upper locking mechanism comprises forcing means for forcing said lift member to be brought to the upper position.

4. The detachable child safety seat according to claim 1, wherein said lower locking mechanism comprises a catch clamp provided in the bottom wall of said base member, an engagement rod provided on the bottom surface of the seat of said seat body so as to be caught by said catch clamp to be engaged, and a locking member supported on said base member and displaced so as to selectively lock an engagement state between said catch clamp and said engagement rod, and said synchronization mechanism comprises a connection member to connect said locking member to said upper locking mechanism.

5. The detachable child safety seat according to claim 4, wherein said lower locking mechanism comprises forcing means for forcing said locking member in an engagement direction.

6. The detachable child safety seat according to claim 5, wherein said synchronization mechanism comprises a stopper member supported on said base member and displaced between an upper position in which said stopper member abuts on said locking member to prevent said locking member from being moved in the engagement direction, and a lower position in which said stopper member is lowered by said engagement rod received in said catch clamp to allow said locking member to be moved in the engagement direction, and an elastic member for forcing the stopper member upward.

7. The detachable child safety seat according to claim 4, wherein said synchronization mechanism comprises an operation member to bring said locking member to an unlocked position.

8. The detachable child safety seat according to claim 1, wherein said upper locking mechanism comprises a lift member which is supported on the stand wall of said base member and can be displaced in the vertical direction, and an engaged member provided on a back surface of the backrest of said seat body so as to be engaged with said lift member when said lift member is brought to an upper position, said lower locking mechanism comprises a catch clamp provided in the bottom wall of said base member, an engagement rod provided on the bottom surface of the seat of said seat body so as to be caught by said catch clamp to be engaged, and a locking member supported on said base member and displaced so as to selectively lock an engagement state between said catch clamp and said engagement rod, and said synchronization mechanism comprises a wire to connect said lift member to said locking member.

9. The detachable child safety seat according to claim 1, wherein when said seat body is positioned on the base member in a forward-looking manner, said front engagement rod and said rear engagement rod engage with said front catch clamps and said rear catch clamps, respectively, when said seat body is positioned on the base member in a backward-looking manner, said rear engagement rod and said front engagement rod engage with said front catch clamps and said rear catch clamps, respectively, and when said seat body is positioned on the base member in a sideways-looking manner, said pair of side engagement rods engages with said front catch clamps and said rear catch clamps, respectively.

10. The detachable child safety seat according to claim 9, wherein said lower locking mechanism locks or unlocks at least either one of said base side front engagement member or said base side rear engagement member and said seat body side engagement member.

11. The detachable child safety seat according to claim 1, wherein said base member comprises:

a rigid frame structure body;

a pair of first belt guide members provided on both sides of said frame structure body, through which a car mounted waist belt passes;

a metal band having both ends connected to said frame structure body; and a pair of second belt guide members positioned inside said pair of first belt guide members in the width direction and fixed to said metal band, through which said waist belt passes.

12. The detachable child safety seat according to claim 11, wherein each one of said second belt guide members respectively is a U-shaped metal hook.

13. The detachable child safety seat according to claim 11, wherein said frame structure body comprises a pair of L-shaped metal bar members positioned on both sides, and a pair of metal side plates fixed to said bar members;

each one of said first belt guide members is respectively fixed to a respective one of said metal side plates; and both ends of said metal band are connected to said pair of metal side plates.

14. The detachable child safety seat according to claim 11, wherein said base member comprises an inclination adjustment member which can be moved between a position in which said inclination adjustment member is protruded downward from the bottom surface and a position in which said inclination adjustment member is retreated in the bottom surface.

15. The detachable child safety seat according to claim 14, wherein said inclination adjustment member is held by said base member such that said inclination adjustment member can pivot.

* * * * *